(12) United States Patent
Leingruber

(10) Patent No.: US 11,378,142 B2
(45) Date of Patent: Jul. 5, 2022

(54) METHOD AND CONTROLLER FOR OPERATING A DRIVETRAIN OF A VEHICLE

(71) Applicant: ZF Friedrichshafen AG, Friedrichshafen (DE)

(72) Inventor: Kai Leingruber, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/291,777

(22) PCT Filed: Nov. 7, 2019

(86) PCT No.: PCT/EP2019/080526
§ 371 (c)(1),
(2) Date: May 6, 2021

(87) PCT Pub. No.: WO2020/094784
PCT Pub. Date: May 14, 2020

(65) Prior Publication Data
US 2022/0010849 A1    Jan. 13, 2022

(30) Foreign Application Priority Data
Nov. 7, 2018 (DE) ...................... 10 2018 218 930.7

(51) Int. Cl.
*F16D 48/06* (2006.01)

(52) U.S. Cl.
CPC .... *F16D 48/06* (2013.01); *F16D 2500/10412* (2013.01); *F16D 2500/3027* (2013.01);
(Continued)

(58) Field of Classification Search
CPC .............................................. B60W 30/18045
See application file for complete search history.

(56) References Cited

U.S. PATENT DOCUMENTS 7,302,333 B2   11/2007  Steen et al.
9,278,687 B2    3/2016  Kimata et al.
(Continued)

FOREIGN PATENT DOCUMENTS

DE        199 14 399 A1   10/2000
DE    60 2004 012 248 T2    3/2009
(Continued)

OTHER PUBLICATIONS

German Search Report Corresponding to 10 2018 218 930.7 dated Jun. 6, 2019.
(Continued)

*Primary Examiner* — Timothy Hannon
(74) *Attorney, Agent, or Firm* — Finch & Maloney PLLC; Michael J. Bujold; Jay S. Franklin

(57) ABSTRACT

A method of operating a vehicle drivetrain for rocking the vehicle free. The drivetrain has a transmission with an input and an output that can be coupled by a clutch. The input and output are connected to a drive aggregate and a drive output, respectively. The clutch is actuated based on driver actuation of an accelerator and a rotational speed of the drive output such that following accelerator actuation, when its actuation decreases, the clutch disengages with a first opening gradient. Then, based on a calculated point in time at which drive aggregate torque upon the clutch corresponds to torque on the clutch from the drive output, the clutch disengages with a second, smaller opening gradient. And depending on a rotational speed of the drive output relative to a limit value, the clutch either initiates or terminates engagement with a first closing gradient.

9 Claims, 1 Drawing Sheet

(52) U.S. Cl.
CPC .............. *F16D 2500/30412* (2013.01); *F16D 2500/30426* (2013.01); *F16D 2500/30428* (2013.01); *F16D 2500/3144* (2013.01); *F16D 2500/507* (2013.01); *F16D 2500/70412* (2013.01)

(56) References Cited

U.S. PATENT DOCUMENTS

| | | | |
|---|---|---|---|
| 9,352,737 B2 | 5/2016 | Pietron et al. | |
| 9,707,965 B2 | 7/2017 | Mair | |
| 9,738,283 B2 | 8/2017 | Mair | |
| 2005/0235765 A1* | 10/2005 | Herbster | F16H 61/0246 74/336 R |
| 2012/0150402 A1 | 6/2012 | Juhlin-Dannfelt et al. | |
| 2012/0158265 A1 | 6/2012 | Juhlin-Dannfelt | |
| 2015/0291168 A1* | 10/2015 | Mair | B60W 30/18045 701/1 |
| 2019/0084567 A1* | 3/2019 | Endres | B60W 30/18 |

FOREIGN PATENT DOCUMENTS

| | | |
|---|---|---|
| DE | 10 2008 036 048 A1 | 2/2010 |
| DE | 10 2010 043 250 A1 | 5/2012 |
| DE | 11 2010 002 845 T5 | 11/2012 |
| DE | 10 2013 111 065 A1 | 4/2014 |
| DE | 11 2013 000 663 T5 | 11/2014 |
| DE | 10 2014 207 081 A1 | 10/2015 |
| DE | 10 2014 207 082 A1 | 10/2015 |
| WO | 2011/005173 A1 | 1/2011 |

OTHER PUBLICATIONS

International Search Report Corresponding to PCT/EP2019/080526 dated Mar. 16, 2020.
Written Opinion Corresponding to PCT/EP2019/080526 dated Mar. 16, 2020.

* cited by examiner

METHOD AND CONTROLLER FOR OPERATING A DRIVETRAIN OF A VEHICLE

This application is a National Stage completion of PCT/EP2019/080526 filed Nov. 7, 2019, which claims priority from German patent application serial no. 10 2018 218 930.7 filed Nov. 7, 2018.

FIELD OF THE INVENTION

The invention relates to a method for operating a drive-train of a vehicle. In addition the invention relates to a control unit for operating a drive-train of a vehicle.

BACKGROUND OF THE INVENTION

A vehicle, which has become stuck in a trough-like depression with slipping wheels so that it is no longer possible to drive directly out of the trough-like depression due to insufficient subsoil friction or due to a yielding subsoil, can often be set free from that situation by so-termed rocking the vehicle free. A possible way to get out of the depression without outside help is to rock the vehicle by cyclic forward and reverse movements.

In vehicles with automated transmissions, an automatic rocking-free mode can be selected by the driver. The rocking-free process then takes place automatically, namely in such manner that depending on actuation of an accelerator pedal by the driver, a clutch connected between a drive input-side shaft and a drive output-side shaft is actuated automatically.

From DE 10 2014 207 082 A1 a method for rocking a vehicle free is known.

Rocking-free methods known from the prior art, in which depending on actuation of an accelerator pedal by the driver, the clutch connected between the drive input side shaft and the drive output side shaft is actuated automatically, can result in knocking in the drive-train which make the rocking-free process uncomfortable. This is a disadvantage.

SUMMARY OF THE INVENTION

The purpose of the present invention is to provide a method and a control unit for operating a drive-train, by virtue of which rocking free can take place more comfortably.

This objective is achieved by a method for operating a drive-train of a vehicle in accordance with the independent claim(s).

According to the invention, to rock the vehicle free the clutch is actuated automatically depending on the driver's actuation of the accelerator pedal and depending on a rotational speed of the drive output, in such manner that when after the accelerator pedal has been actuated, the actuation of the accelerator pedal is decreased, the clutch is first opened with a defined first opening gradient.

According to the invention, subsequently, depending on a calculated point in time at which the value of torque from the drive aggregate acting upon the clutch corresponds to the torque acting upon the clutch from the drive output side, the opening of the clutch with the defined, first opening gradient is terminated and the clutch is opened with a defined, second opening gradient, which is smaller.

Then, when the value of a gradient of the rotational speed of the drive output becomes larger than a limit value, according to the invention closing of the clutch begins with a defined first closing gradient.

According to the invention, subsequently, when the value of the gradient of the rotational speed of the drive output becomes smaller than a limit value, the closing of the clutch with the defined, first closing gradient is terminated.

The method according to the invention allows comfortable rocking-free of the vehicle while avoiding knocking in the drive-train.

According to an advantageous further development, when the closing of the clutch with the defined first closing gradient is terminated, the closed position of the clutch is held constant until a new actuation of the accelerator pedal is increased. This makes possible a comfortable and effective rocking-free process of the vehicle.

In an advantageous further development, when a new actuation of the accelerator pedal is increased, the clutch is closed with a defined second closing gradient which is larger than the first closing gradient. This can further increase the comfort during the rocking-free process.

According to an advantageous further development, with the second closing gradient the clutch is closed until torque transmitted by the clutch corresponds to a torque desired by the driver as a function of the actuation of the accelerator pedal. This too serves to enable comfortable and effective rocking-free of the vehicle.

The control unit according to the invention is defined in the independent claim(s).

Preferred further developments emerge from the subordinate claims and from the following description. Example embodiments of the invention, to which it is not limited, are explained in greater detail with reference to the drawings, which show:

DETAILED DESCRIPTION OF THE PREFERRED EMBODIMENTS

Figure 1:
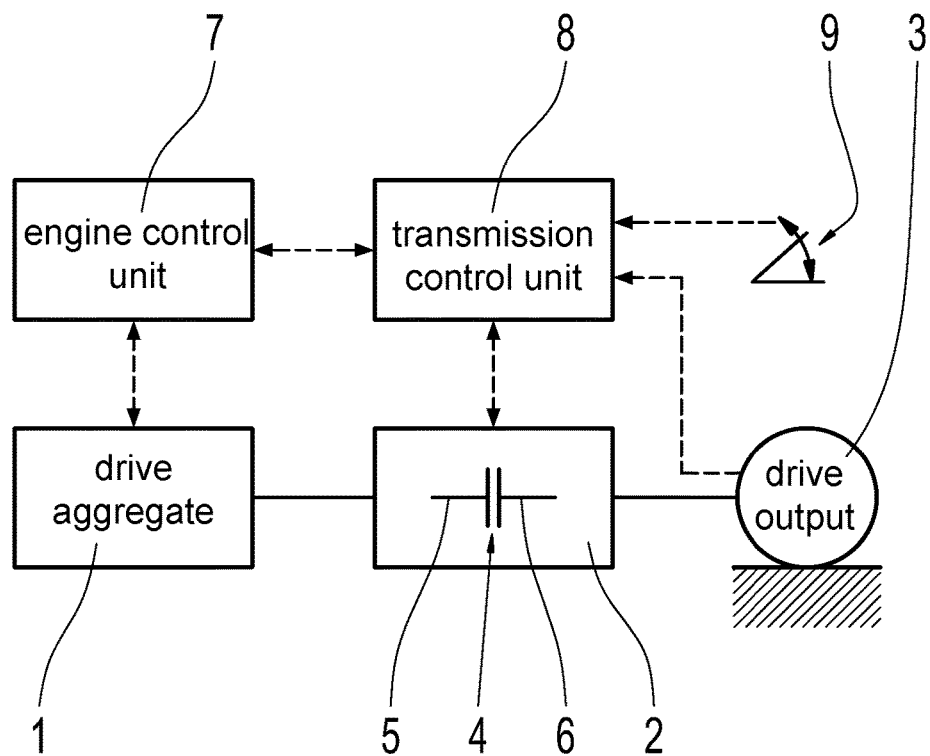
FIG. 1: A diagram representing a drive-train of a vehicle.

FIG. 1 shows a diagram representing a drive-train of a vehicle, wherein the vehicle comprises a drive aggregate 1 and a transmission 2 connected between the drive aggregate 1 and a drive output 3. The transmission 2 converts rotational speeds and torques, and thereby transmits the traction produced by the drive aggregate 1 to the drive output 3.

FIG. 1 also shows a clutch 4. The clutch 4 shown in FIG. 1 is a transmission-internal shifting element. Half of the clutch 4 is connected to a shaft 5 on the drive input side and the other half of the clutch 4 is connected to a shaft 6 on the drive output side.

When the clutch 4 is open, the drive aggregate 1 is decoupled from the drive output 3. On the other hand when the clutch 4 is closed, the drive aggregate 1 is coupled to the drive output 3.

The clutch 4 can also be a clutch which is external to the transmission and connected between the drive aggregate 1 and the transmission 2.

The operation of the drive aggregate 1 is controlled and/or regulated by an engine control unit 7. The operation of the transmission 2 is controlled and/or regulated by a clutch control unit 8. From FIG. 1 it can be seen that the engine control unit 7 exchanges data with the drive aggregate 1 and the transmission control unit 8 exchanges data with the transmission 2, as represented by the broken double-arrows, respectively. Moreover, the engine control unit 7 and the transmission control unit 8 exchange data between one another.

FIG. 1 also shows an accelerator pedal 9. The accelerator pedal 9 is also called the gas pedal. The accelerator pedal 9 is actuated by the driver.

Depending on the actuation of the accelerator pedal 9 by the driver, which is detected by means of sensors and sent to the transmission control unit 8 as an input variable, the torque desired by the driver can be determined in the transmission control unit 8. The actuation of the accelerator pedal 9 detected by sensors can either be sent to the transmission control unit 8 directly as an input variable, or it can be sent to the transmission control unit 8 by way of a further control unit which determines the actuation of the accelerator pedal 9 from the signal received from the sensors.

As a further input variable the transmission control unit 8 also receives from the drive output 3 a rotational speed of the drive output 3. The rotational speed of the drive output 3 can for example be determined with the help of a rotational speed sensor associated with the wheels of the motor vehicle. The signals received as input variables and control or data signals to be emitted from the control units 7, 8 can be transmitted via a vehicle bus, for example via a CAN bus.

The invention now relates to details by virtue of which a vehicle can be rocked free with a high level of comfort. In this case a rocking-free operating mode can be selected by the driver and thereby activated. In the active rocking-free operating mode the clutch 4 is actuated automatically by the transmission control unit 8 to rock the vehicle free.

The actuation of the clutch 4 in the rocking-free operating mode takes place as a function of the actuation of the accelerator pedal 9 by the driver and as a function of the rotational speed of the drive output 3.

In this case, the procedure is that after the accelerator pedal 9 has been actuated and the actuation of the accelerator pedal 9 is decreased again, the clutch 4 is first opened with a defined, first opening gradient. Then, depending on a calculated point in time when torque acting upon the clutch 4 from the drive aggregate 1 has a value corresponding to a torque acting upon the clutch 4 from the drive output 3, and when therefore the clutch 4 is approximately free from torque, the opening of the clutch 4 with the defined first opening gradient is terminated and the clutch 4 is opened with a defined second opening gradient which is smaller than the first opening gradient. Thereafter, when the value of a rotational speed gradient of the drive output becomes larger than a limit value, the closing of the clutch 4 begins with a defined first closing gradient. When the value of the gradient of the rotational speed of the drive output 3 becomes smaller than a limit value, the closing of the clutch 4 with the defined first closing gradient is terminated.

By virtue of the present invention it is made possible to avoid knocking in the drive-train between two successive actuations of the accelerator pedal 9 during a rocking-free process. The vehicle can be rocked free with a high level of comfort.

Figure 2:
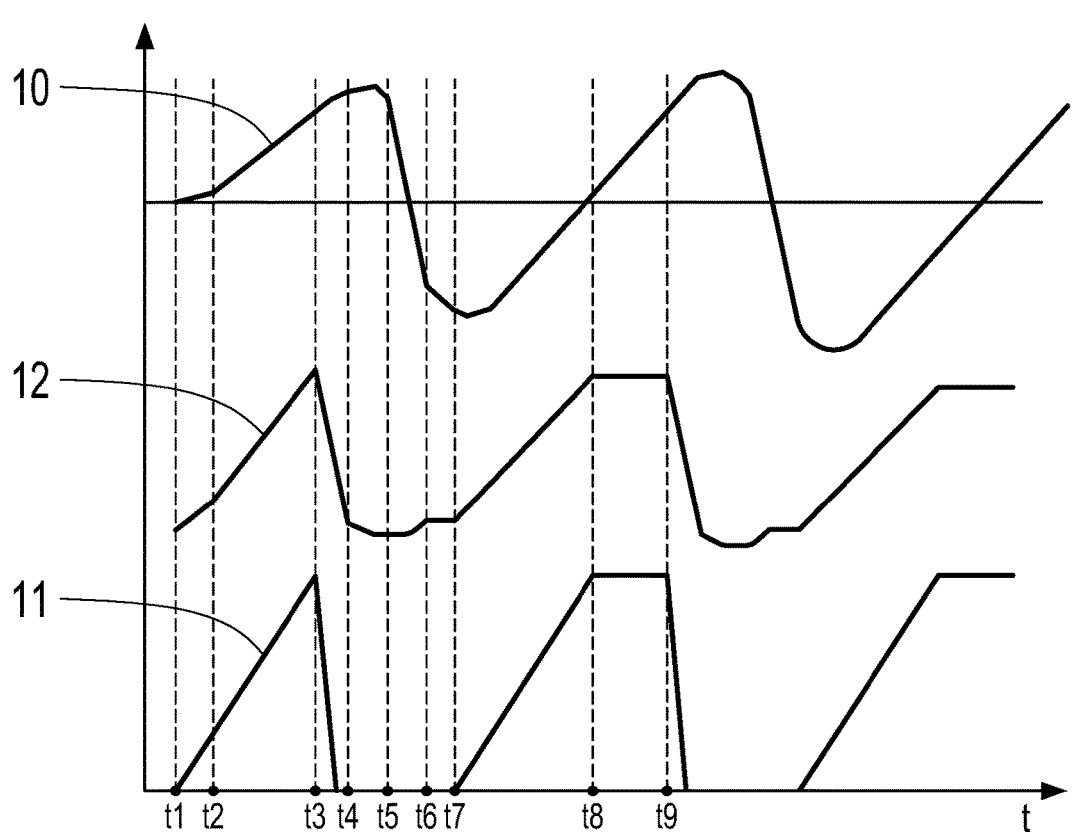
FIG. 2: A time diagram with several time variations, to illustrate the method according to the invention for operating a drive-train.

Below, further details of the invention are described with reference to the time diagram shown in FIG. 2. In FIG. 2 several signal variations in time are plotted against time t, namely with a signal variation 10 representing a rotational speed variation for the rotational speed at the drive output 3, i.e. a drive output rotational speed variation. A curve 11 visualizes actuation of the accelerator pedal 9 by the driver, so the signal variation 11 represents an accelerator pedal actuation variation. Accordingly, the signal variation 12 is a clutch actuation variation.

In FIG. 2, when the rocking-free operating mode is active the rocking-free of the vehicle begins at time t1. Accordingly, as shown by the signal variation 11, the actuation of the accelerator pedal 9 begins at time t1.

Starting at time t1, as shown by the signal variation 12, the clutch 4 is first closed with a first closing gradient which first closing gradient lasts between times t1 and t2 and serves to take up any of the so-termed slack in the drive-train.

Then, at time t2 the clutch 4 is closed with a second, larger closing gradient, wherein the change from the first, relatively smaller closing gradient to the second, relatively larger closing gradient takes place at time t2 as a function of the rotational speed at the drive output 3. At time t2 the rotational speed at the drive output 3 becomes larger than a limit value stored in the control unit, such that, at time t2, the clutch 4 is changed from the first, relatively smaller closing gradient to the second, relatively larger closing gradient.

Between times t2 and t3 the clutch 4 is then closed with the second, relatively larger closing gradient, to the extent that the clutch 4 transmits a torque that corresponds to the torque desired by the driver, which is deduced from the actuation of the accelerator pedal 9 by the driver.

As shown in FIG. 2, at time t3 the driver's actuation of the accelerator pedal 9 is reduced again.

When the driver's actuation of the accelerator pedal 9 is reduced at time t3, then in accordance with the signal variation 12 the clutch 4 is opened with a first opening gradient, namely in FIG. 2 between times t3 and t4. At time t4, according to FIG. 2 a change takes place from the first opening gradient of the clutch 4 to a second, smaller opening gradient of the clutch 4.

The change from the first, relatively larger opening gradient to the second, relatively smaller opening gradient for the clutch 4, takes place at time t4 as a function of a calculated point in time at which the value of torque acting upon the clutch 4 from the drive aggregate 1 corresponds to the value of torque acting upon the clutch 4 from the drive output 3, at which time the clutch 4 is consequently approximately free from torque.

That point in time can be calculated in the transmission control unit 8, so that depending on the calculated time point the change from the first opening gradient of the clutch 4 to its second, smaller opening gradient takes place at time t4. In FIG. 2 the second, relatively smaller closing gradient lasts between times t4 and t5; the interval between times t4 and t5 can also be called the run-down interval of the clutch 4.

At time t5 the clutch 4 begins closing with a defined closing gradient. The closing of the clutch 4 begins when the value of a gradient of the rotational speed 10 of the drive output 3 becomes larger than a limit value. FIG. 2 shows that at time t5 the gradient of the rotational speed 10 is larger than the respective limit value stored by the control unit, so that then, starting at time t5, the clutch 4 begins closing automatically, and this without any actuation of the accelerator pedal 9 by the driver. This closing of the clutch 4 starting at time t5 takes place, as in FIG. 2, until time t6, namely until a point in time when the value of the rotational speed 10 at the drive output 3 becomes smaller than a limit value stored in the control unit. When that is the case, at time t6 the closing of the clutch 4 with the defined, first closing gradient is terminated. Between times t5 and t6, between which therefore the clutch 4 is closed with the first closing gradient, the clutch is closed until it can transmit exactly as much torque as required to take up any slack in the drive-train, whereby to some extent the drive-train is braced or stressed.

When at time t6 the gradient of the rotational speed of the drive output 3 becomes smaller than the limit value stored in the control unit, then as already mentioned the closing of the clutch 4 with the first closing gradient is terminated and the closed position of the clutch 4 is kept constant until the accelerator pedal 9 is actuated again. In FIG. 2 the closed position of the clutch 4 is kept constant between times t6 and t7.

In FIG. 2, at time t7 according to the signal variation 11, the accelerator pedal 9 is actuated again. Thus, at time t7 the clutch 4 begins to be closed with a defined second closing gradient, and this continues until time t8, so that the closing of the clutch 4 between times t7 and t8 takes place analogously to its closing between times t2 and t3, i.e. until the clutch 4 transmits a torque that corresponds to a driver's desired torque which depends on the actuation of the accelerator pedal 9 by the driver.

In FIG. 2, at time t8 the accelerator pedal actuation 11 remains constant, so that the actuation 12 of the clutch 4 also remains constant until, at time t9, the driver's actuation of the accelerator pedal ceases again. Beginning at time t9, the process steps already described above as far as time t3 are then repeated.

By virtue of the invention, a vehicle can be rocked free with a high level of comfort, avoiding knocking in the drive-train.

The invention further relates to a control unit for carrying out the method, this control unit being the transmission control unit 8.

When a rocking-free operating mode of the drive-train is activated by the driver, the control unit 8 automatically controls the clutch 4 to rock the vehicle free as a function of the actuation of the accelerator pedal 9 by the driver and as a function of the rotational speed at the drive output 3, as described above.

During this it is significant that when, after an actuation of the accelerator pedal 9, the actuation of the accelerator pedal 9 is decreased, the control unit 8 first actuates the clutch 4 with a defined, first opening gradient. The control unit 8 calculates a point in time when the value of torque from the drive aggregate 1 acting upon the clutch 4 corresponds to torque acting upon the clutch 4 from the drive output 3, and accordingly the clutch 4 is free or approximately free from torque, so that depending on this calculated time point the control unit 8 terminates the opening of the clutch 4 with the first opening gradient and actuates the clutch 4 with a second, smaller opening gradient. During this the control unit 8 monitors the value of the gradient of the rotational speed at the drive output 3. If the value of the gradient of the rotational speed 10 at the drive output 3 is larger than a limit value, the control unit 8 actuates the clutch 4 with a first stored closing gradient. Thereafter, if the value of the gradient of the rotational speed 10 at the drive output 3 becomes smaller than a limit value stored in the control unit, the control unit 8 terminates the closing of the clutch 4 with the first defined closing gradient and keeps the closing position of the clutch 4 constant, preferably until the accelerator pedal 9 is actuated again.

The control unit 8 comprises means for carrying out the method according to the invention. These include software and hardware means. The hardware means include data interfaces for the exchange of data with the assemblies involved, for example the drive output 3, the accelerator pedal 9 and the clutch 4.

In addition the hardware means include a processor for data processing and a memory for data storage. The software means consist of software modules for carrying out the method.

INDEXES

1 Drive aggregate
2 Transmission
3 Drive output
4 Clutch
5 Shaft
6 Shaft
7 Engine control unit
8 Transmission control unit
9 Accelerator pedal
10 Drive output rotational speed variation
11 Accelerator pedal actuation variation
12 Clutch actuation variation

The invention claimed is:

1. A method of operating a drive-train of a vehicle in order to rock the vehicle free, the drive-train having a drive aggregate, a drive output and a transmission which is arranged in the drive-train between the drive aggregate and the drive output, the transmission having a controllable clutch which has a drive input side and a drive output side, a shaft connected to the drive input side of the clutch is connected to the drive aggregate and a shaft connected to the drive output side of the clutch is connected to the drive output, the method comprising:
   when a rocking-free operating mode is active for rocking the drive-train free, and depending upon an actuation of an accelerator pedal by a driver, automatically actuating the clutch to rock the vehicle free,
   automatically actuating the clutch as a function of the actuation of the accelerator pedal by the driver and as a function of a rotational speed of the drive output,
   initially opening the clutch with a defined first opening gradient, when the accelerator pedal is actuated and the actuation of the accelerator pedal is then decreased,
   thereafter, as a function of a calculated point in time at which a value of a torque from the drive aggregate that acts upon the clutch corresponds to a torque acting upon the clutch from the drive output, terminating disengagement of the clutch with the defined first opening gradient and disengaging the clutch with a defined second opening gradient, which is smaller than the first opening gradient,
   then, when a value of a gradient of the rotational speed of the drive output becomes larger than a limit value, commencing engagement of the clutch with a defined first closing gradient,
   and then, when the value of the gradient of the rotational speed of the drive output becomes smaller than a limit value, terminating engagement of the clutch with the defined first closing gradient.

2. The method according to claim 1, further comprising when the engagement of the clutch with the defined first closing gradient is terminated, maintaining an engagement position of the clutch constant until the accelerator pedal is actuated again.

3. The method according to claim 2, further comprising when the accelerator pedal is actuated again, engaging the clutch with a defined second closing gradient which is larger than the first closing gradient.

4. The method according to claim 3, further comprising engaging the clutch with the second closing gradient until a torque transmitted by the clutch corresponds to a torque desired by the driver as a function of actuation of the accelerator pedal.

5. A control unit for operating a transmission of a vehicle, such that when a rocking-free operating mode of the drive-train for rocking the vehicle free is active, the control unit automatically actuates a clutch to rock the vehicle free depending on an actuation of an accelerator pedal by a driver,
- the control unit automatically actuates the clutch to rock the vehicle free, as a function of the actuation of the accelerator pedal by the driver and as a function of a rotational speed of an drive output, in such manner that
- when, after an actuation of the accelerator pedal and the actuation of the accelerator pedal is then decreased, the control unit first actuates the clutch with a defined first opening gradient,
- then, as a function of a calculated point in time at which a value of torque from a drive aggregate that acts upon the clutch corresponds to a torque acting upon the clutch from the drive output, the control unit terminates the disengagment of the clutch with the defined first opening gradient and actuates the clutch with a defined second opening gradient, which is smaller than the first opening gradient,
- and then, if a value of a gradient of the rotational speed of the drive output becomes larger than a limit value, the control unit actuates the clutch with a defined first closing gradient,
- and then, if the value of the gradient of the rotational speed of the drive output becomes smaller than a limit value, the control unit terminates the engagement of the clutch with the defined first closing gradient.

6. The control unit according to claim 5, wherein when the control unit terminates engagement of the clutch with the defined first closing gradient, the control unit maintains an engaged position of the clutch constant until the actuation of the accelerator pedal is increased again.

7. The control unit according to claim 6, wherein when new actuation of the accelerator pedal is increased, the control unit actuates the clutch with a defined second closing gradient which is larger than the first closing gradient.

8. The control unit according to claim 7, wherein with the second closing gradient, the control unit engages the clutch until a torque transmitted by the clutch corresponds to a torque desired by the driver that depends on the actuation of the accelerator pedal.

9. A method of operating a drive-train of a vehicle for rocking the vehicle free from a depression, the drive-train having, in a direction of toque transmission, a drive aggregate connected to an input shaft of a transmission, a controllable clutch having an input side connected to the input shaft and an output side connected to an output shaft of the transmission, the output shaft being connected to a drive output, the clutch being automatically actuatable to disengage and engage to controllably transmit drive from the input shaft to the output shaft, the method comprising:
- activating a rocking-free operating mode for rocking the vehicle free, and automatically actuating the clutch to rock the vehicle free as a function of actuation of the accelerator pedal by a driver and as a function of a rotational speed of the drive output such that:
- disengaging the clutch with a defined first opening gradient when the accelerator pedal is actuated and actuation of the accelerator pedal decreases,
- terminating the disengagement of the clutch with the defined first opening gradient and disengaging the clutch with a defined second opening gradient, which is smaller than the first defined opening gradient, as a function of a calculated point in time when a value of torque from the drive aggregate that acts upon the clutch corresponds to torque acting upon the clutch from the drive output,
- initiating engagement of the clutch with a defined first closing gradient when a value of a gradient of the rotational speed of the drive output is larger than a limit value, and
- terminating engagement of the clutch with the defined first closing gradient when the value of the gradient of the rotational speed of the drive output is smaller than the limit value.

* * * * *